Patented Jan. 20, 1953

2,626,212

UNITED STATES PATENT OFFICE 2,626,212

SELECTIVE HERBICIDAL COMPOSITION

Frank J. Sowa, Cranford, N. J.

No Drawing. Application February 8, 1952,
Serial No. 270,749

12 Claims. (Cl. 71—2.4)

This invention relates to herbicides which, under controlled conditions, are selective in their action in that they serve to kill crab grass, and broad leaf plants without substantial injury to desirable lawn grasses.

As described in my co-pending application Serial No. 136,850 filed January 4, 1950, as filed, it has been found that ammonia-boron fluoride compounds such as monoammino boron trifluoride ($NH_3.BF_3$) and ammonium fluoborate ($NH_4BF_4$) may be used for weed killing and sterilizing soil although they also may be used for the selective killing of crab grass when they are used in combination with a wetting agent and are applied in limited concentrations. It is also well known that chlorinated phenoxy acetic acids, such as 2,4-dichloro phenoxy acetic acid and 2,4,5-trichloro phenoxy acetic acid and the salts and esters of these acids (commonly known as "2,4-D" and "2,4,5-T") are useful in killing broad leaf plants such as plantain.

2,4-D and 2,4,5-T have limitations as herbicidal compositions in that they are not active in killing crab grass which has matured beyond the single leaf stage. On the other hand, the ammonia-boron fluoride compounds generally have to be employed in relatively high concentrations even when a wetting agent is used in order to be effective in killing crab grass.

I have now discovered that these two types of weed killing agents, when employed in combination, are effective for the selective killing of crab grass at surprisingly reduced concentrations. Furthermore, the tendency for the composition to injure the desired grasses is much more limited at the concentrations required for effective killing of crab grass when these two agents are used in combination.

One of the objects of the present invention is to provide a novel weed killing composition.

Another object of the invention is to kill crab grass and broad leaf plants without substantial injury to other more desirable grasses.

A further object of the invention is to reduce the amount of herbicidal agent required for crab grass control.

These and other objects and features of the present invention will appear from the following description thereof in which typical compositions and methods are described for the purpose of indicating the nature of the present invention but without intending to limit the scope of the invention thereby.

The compositions of the present invention contain, as their essential active ingredients, an ammonia-boron fluoride composition and a polychlorinated phenoxy acetic acid compound. The ammonia-boron fluoride compound may be monoammino boron trifluoride ($NH_3.BF_3$) or ammonium fluoborate ($NH_4BF_4$), whereas the phenoxy acetic acid compound may be selected from the ammonium and amine salts and the esters of either 2,4-dichloro phenoxy acetic acid (herein referred to as 2,4-D) or 2,4,5-trichloro phenoxy acetic acid (herein referred to as 2,4,5-T). The ammonium salts of each acid are preferred although the amine salts of the acids, such as the propyl, butyl, octyl, lauryl, dimethyl, trimethyl, ethyl, diethyl, triethyl, triethanol, isopropanol, allyl and abietyl amine salts may be used. It is also found that esters of the chloro phenoxy acetic acids such as the normal propyl, isopropyl, normal butyl, isobutyl, amyl and octyl esters as well as the esters of monoethyl ether of ethylene glycol or diethylene glycol are very effective.

The compositions of the present invention also include wetting agents which cause the aqueous solutions of the active ingredients to spread over the surfaces to which they are applied. It is found that such spreading agents are necessary if effective coverage and killing action is to result. In fact, it may well be that the spreading agent has some activating or synergistic effect in the combination.

The preferred forms of wetting agent used are those of the non-ionic type such as polyethylene ether of fatty alcohols or polyethylene glycol condensation products, or in fact, substantially any of the conventional wetting agents which are compatible with the ammonia-boron fluoride compounds and the chloro phenoxy acetic acid salts. The amount of the wetting agent used preferably is sufficient to impart to the solution of the active ingredients a surface tension below about 40 dynes per centimeter at 23° C., although solutions having a surface tension up to 50 dynes per centimeter may be used. The amount of wetting agent employed generally equals from .10 to 5% by weight of the aqueous solution employed in treating crab grass.

The total amount of active ingredients applied may vary from about 4 to 50 pounds per acre and generally is in the neighborhood of 15 to 35 pounds per acre. The proportions of the ingredients are as follows:

Parts by weight
Ammonia-boron fluoride compound_____ 1 to 50
Chloro phenoxy acetic acid compound___ 1 to 30
Water, sufficient for convenient application with the equipment available.
Wetting agent, sufficient to reduce the surface tension below 50 dynes per centimeter at 23° C.—generally from 1 to 50 parts by weight.

The active ingredients are preferably mixed together and the wetting agent distributed throughout the mix. When the wetting agent is itself a powdered, waxy or flaky material such as the flaky ethylene glycol condensation product sold under the trade name "Pluronics F-68" produced by Wyandotte Chemicals Corp. or the waxy form of condensation product sold under the trade name "Emulphor ON" produced by General Dyestuff Corporation (U. S. Patent 1,970,578), the resulting mixture is a substantially dry powdered product which is readily packaged for shipment and storage. When the wetting agent is a liquid form of ethylene glycol condensation product such as the product sold under the trade name "Igepal 300" produced by General Dyestuff Corporation, the mixture may be in liquid form.

When using either form of mixture it is dissolved in water sufficient to permit ready application by means of conventional spraying equipment and in general from 200 to 400 gallons of water having the active ingredients dissolved therein are applied to each acre to be treated. The concentration of the active ingredients in solution may vary from about 0.1 to 2% and preferably is about 1% based on the weight of the water. The composition may be applied in a single dosage although in some instances it is preferable to use more dilute solutions and to make two or three applications.

A typical and preferred composition produced in accordance with the present invention is as follows:

Example I 1 pound of $NH_3 \cdot BF_3$, 5 pounds of the ammonium salt of 2,4-D and 8 pounds of a wetting agent in the form of a polyethylene glycol condensation product ("Igepal 300") are dissolved in 360 gallons of water. In tests conducted by New Jersey Agricultural Experiment Station at Rutgers University this composition was applied by conventional spraying means at the rate of 360 gallons per acre. The area treated was turf infected with crab grass. In these tests the composition described was found to be highly effective in selectively killing the crab grass in that over 90% of the crab grass was killed without appreciable or permanent injury to the remaining desired grasses. During the latter part of the summer and when the crab grass is tough and flourishing, two or three applications of the foregoing composition may be employed. The total amount of active herbicidal agent used was only 6 pounds per acre for a single application. Best results were obtained by making three applications one week apart whereby a total of 18 pounds per acre when 93% control was obtained.

This example provides a striking contrast with methods described in the above identified copending application since in accordance with said application, in similar tests in which the ammonia boron fluoride compound is used in combination with a wetting agent but in the absence of any chloro phenoxy acetic acid compound, it was found necessary to use 25 pounds of the active ingredients in each application or a total of 75 pounds per acre in three applications to produce comparable results. The example is further noteworthy in that the salts of 2,4-D which predominate in the mixture are not active crab grass killers when applied by themselves to mature crab grass.

The composition of Example I was employed with similar results using the ester of monoethyl ether of ethylene glycol as the ester of 2,4-D and when using the trimethyl amine salts of 2,4-D in place of the ammonium salt of 2,4-D, the same quantities and methods of application being used.

Example II

The composition of Example I was employed with similar results when substituting ammonium fluoborate ($NH_4BF_4$) for the monoammino boron trifluoride ($NH_3 \cdot BF_3$).

Example III

In further tests conducted at Rutgers University, 32 pounds of $NH_3 \cdot BF_3$ and 1.7 pounds of ammonium salt of 2,4-D together with sufficient wetting agent to produce solutions having surface tensions of about 40 dynes per centimeter at 23° C. were dissolved in 250 gallons of water. This composition was sprayed on turf infected with crab grass at the rate of 250 gallons per acre. The composition was found to kill over 90% of the crab grass without material or permanent injury to the other desirable grasses. The same total amount of active ingredients may be applied in two separate applications using 16 pounds of $NH_3 \cdot BF_3$ and 0.85 pound of the ammonium salts of 2,4-D in 200 gallons of water per acre for each application.

Example IV

The methods of Examples I to III may be duplicated using the diethyl amine or triethanol amine salt of either 2,4-D or 2,4,5-T without substantial change in the proportions of the constituents or the methods of application.

For convenience in packaging and distributing the composition, the dry or liquid mixture containing no water may be prepared by simply mixing the constituents of the composition together. No separation or deterioration of the mixture occurs on long standing. A typical mixture of the type used in producing the solution of Example I is as follows:

| | Pounds |
|---|---|
| $NH_3.BF_3$ | 30 |
| 2,4-D (ammonium salt) | 150 |
| Wetting agent | 240 |

A mixture of the type used in forming the solution of Example III is as follows:

| | Pounds |
|---|---|
| $NH_3.BF_3$ | 950 |
| 2,4-D (ammonium salt) | 50 |
| Wetting agent | 30 |

While various compositions have been described and typical methods for using such compositions have been cited it will be apparent that they may be varied considerably by the addition of other agents thereto and by their application in other ways to areas in which weeds or vegetation is to be killed. In view thereof it should be understood that the examples cited above are intended to be illustrative only and are not intended to limit the scope of the invention.

I claim:

1. An herbicidal composition comprising as active ingredients from 1 to 50 parts by weight of an ammonia-boron fluoride compound selected from the group consisting of monoammino boron trifluoride and ammonium fluoborate and from 1 to 30 parts by weight of a chloro phenoxy acetic acid compound selected from the group consisting of the ammonium and amine salts and the esters of 2,4-dichloro phenoxy acetic acid and 2,4,5-trichloro phenoxy acetic acid together with a wetting agent which is compatible in aqueous solution with said ingredients.

2. An herbicidal composition comprising as active ingredients 1 to 50 parts by weight of an ammonia-boron fluoride compound selected from the group consisting of monoammino boron trifluoride and ammonium fluoborate and from 1 to 30 parts by weight of a chloro phenoxy acetic acid compound selected from the group consisting of the ammonium and amine salts and the esters of 2,4-dichloro phenoxy acetic acid and 2,4,5-trichloro phenoxy acetic acid together with from 1 to 50 parts by weight of a non-ionic wetting agent.

3. An herbicidal composition containing approximately 1 part by weight of an ammonia-boron fluoride compound selected from the group consisting of monoammino boron trifluoride and ammonium fluoborate, 5 parts by weight of a compound selected from the group consisting of the ammonium and amine salts and the esters of 2,4-dichloro phenoxy acetic acid and 2,4,5-trichloro phenoxy acetic acid, and 8 parts by weight of a non-ionic wetting agent.

4. An herbicidal composition containing approximately 950 parts by weight of an ammonia-boron fluoride compound selected from the group consisting of monoammino boron trifluoride and ammonium fluoborate, 50 parts by weight of a compound selected from the group consisting of the ammonium and amine salts and the esters of 2,4-dichloro phenoxy acetic acid and 2,4,5-trichloro phenoxy acetic acid, and 30 parts by weight of a non-ionic wetting agent.

5. An herbicidal composition consisting of an aqueous solution containing from about 0.10 to 2% by weight of active ingredients comprising an ammonia-boron fluoride compound selected from the group consisting of monoammino boron trifluoride and ammonium fluoborate, and a compound selected from the group consisting of the ammonium and amine salts and the esters of 2,4-dichloro phenoxy acetic acid and 2,4,5-trichloro phenoxy acetic acid, said composition containing a non-ionic wetting agent and having a surface tension below 50 dynes per centimeter at 23° C.

6. An herbicidal composition consisting of an aqueous solution containing from about 0.10 to 2% by weight of active ingredients comprising an ammonia-boron fluoride compound selected from the group consisting of monoammino boron trifluoride and ammonium fluoborate, and a compound selected from the group consisting of the ammonium and amine salts and the esters of 2,4-dichloro phenoxy acetic acid and 2,4,5-trichloro phenoxy acetic acid, and from 0.10 to 5% by weight of a non-ionic wetting agent.

7. An herbicidal composition consisting of an aqueous solution containing from about 0.10 to 2% by weight of active ingredients of which from 1 to 50 parts by weight is an ammonia-boron fluoride compound selected from the group consisting of monoammino boron trifluoride and ammonium fluoborate, and from 1 to 30 parts by weight is a chloro phenoxy acetic acid compound selected from the group consisting of the ammonium and amine salts and the esters of 2,4-dichloro phenoxy acetic acid and 2,4,5-trichloro phenoxy acetic acid, said solution containing a non-ionic wetting agent and having a surface tension below 50 dynes per centimeter at 23° C.

8. An herbicidal composition consisting of an aqueous solution containing from about 0.10 to 2% by weight of active ingredients of which 1 part by weight is an ammonia-boron fluoride compound selected from the group consisting of monoammino boron trifluoride and ammonium fluoborate, and 5 parts by weight is a chloro phenoxy acetic acid compound selected from the group consisting of the ammonium and amine salts and the esters of 2,4-dichloro phenoxy acetic acid and 2,4,5-trichloro phenoxy acetic acid, said solution containing a non-ionic wetting agent and having a surface tension below 50 dynes per centimeter at 23° C.

9. An herbicidal composition consisting of an aqueous solution containing from about 0.10 to 2% by weight of active ingredients of which 95 parts by weight is an ammonia-boron fluoride compound selected from the group consisting of monoammino boron trifluoride and ammonium fluoborate, and 5 parts by weight is a chloro phenoxy acetic acid compound selected from the group consisting of the ammonium and amine salts and the esters of 2,4-dichloro phenoxy acetic acid and 2,4,5-trichloro phenoxy acetic acid, said solution containing a non-ionic wetting agent and having a surface tension below 50 dynes per centimeter at 23° C.

10. The method of selectively killing crab grass which comprises the steps of applying thereto an aqueous solution containing from 0.10 to 2% of a mixture of active ingredients consisting of an ammonia-boron fluoride compound selected from the group consisting of monoammino boron trifluoride and ammonium fluoborate and a chloro phenoxy acetic acid compound selected from the group consisting of the ammonium and amine salts and the esters of 2,4-dichloro phenoxy acetic acid and 2,4,5-trichloro phenoxy acetic acid, said solution containing a wetting agent and having a surface tension below about 50 dynes per centimeter at 23° C., the rate of application of said solution being such as to apply from about 5 to 50 pounds of said active ingredients to an acre of turf to be treated.

11. The method of selectively killing crab grass which comprises the steps of applying an aqueous solution containing as active ingredients monoammino boron trifluoride and the ammonium salt of 2,4-dichloro phenoxy acetic acid to the crab grass at the rate of from about 5 to 50 pounds of active ingredients per acre, said solution containing a wetting agent and having a surface tension below 50 dynes per centimeter at 23° C.

12. The method of selectively killing crab grass which comprises the steps of applying to the crab grass a solution containing 1 pound of monoammino boron trifluoride and 5 pounds of the ammonium salt of 2,4-dichloro phenoxy acetic acid together with a wetting agent dissolved in from 200 to 400 gallons of water, the solution being applied at the rate of from about 6 to 18 pounds of active ingredients per acre, said solution having a surface tension below 50 dynes per centimeter at 23° C.

FRANK J. SOWA.

REFERENCES CITED

The following references are of record in the file of this patent:

UNITED STATES PATENTS

| Number | Name | Date |
|---|---|---|
| 2,390,941 | Jones | Dec. 11, 1945 |
| 2,544,141 | Donleavy | Mar. 6, 1951 |